Nov. 10, 1970   A. F. SCHROM   3,538,759
TEST STAND FOR VEHICLE ENGINES
Filed July 18, 1968   3 Sheets-Sheet 1

INVENTOR.
Andrew F. Schrom
BY
Gregory S. Dolgorukov
ATTORNEY

Nov. 10, 1970 A. F. SCHROM 3,538,759
TEST STAND FOR VEHICLE ENGINES
Filed July 18, 1968 3 Sheets-Sheet 2

INVENTOR.
Andrew F. Schrom
BY
Gregory S. Dolgorukov
ATTORNEY

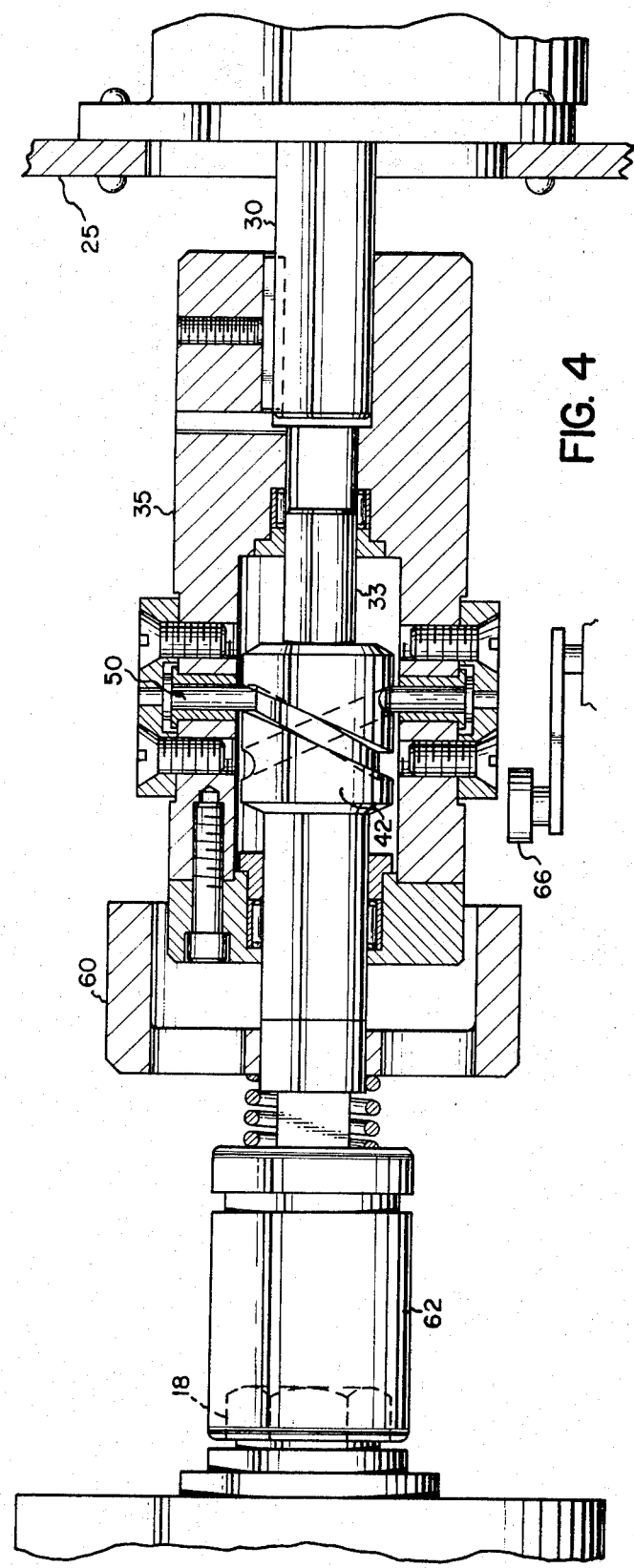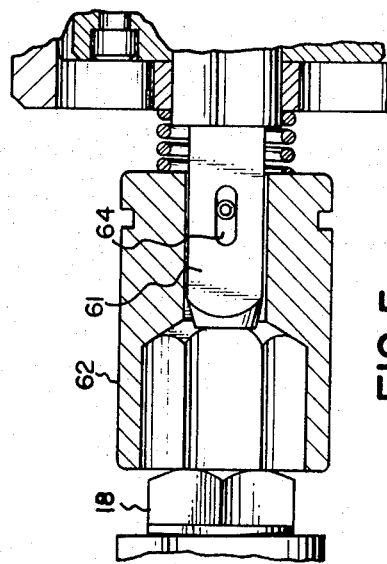

United States Patent Office 3,538,759
Patented Nov. 10, 1970

3,538,759
TEST STAND FOR VEHICLE ENGINES
Andrew F. Schrom, Livonia, Mich., assignor to Scans Associates, Inc., Livonia, Mich., a corporation of Michigan
Filed July 18, 1968, Ser. No. 745,925
Int. Cl. G01m 15/00
U.S. Cl. 73—116    7 Claims

ABSTRACT OF THE DISCLOSURE

The application discloses an improved test stand for motor vehicle engines, which stand receives test engines automatically, and which includes a device for starting such engines from its front end by a direct drive connection with its crankshaft and without the use of any speed reducing device; with engagement of the engine crankshaft, starting the engine, and disengagement of the engine from the starting device after starting being done automatically.

---

This invention relates to systems for testing motor vehicle engines, such, for instance, as that disclosed in the application of Vernon G. Converse III et al., Ser. No. 717,103, filed on Mar. 29, 1968 for Automation System and Method. More particularly, the present application relates to an improved test stand forming a part of such system and adapted to receive test engines automatically, to locate the test engine in place, to make all operative connections, such as for fuel supply, cooling water, removal of exhaust gases, and the like, to start the engine and to run it in accordance with the prescribed test procedure.

One of the difficulties encountered by those skilled in the art in providing such systems and constructing test stands therefor has been in the matter of providing means for starting the test engine after the same is set in place in the test stand. A test stand designed for safe and efficient operation is usually adapted to receive the test engine moving from a conveyor transversely thereof and with the front end of the engine leading, i.e. coming in first. Such an arrangement has been considered by those skilled in the art to be more advantageous, since it permits to have various test service devices to be located at the terminal or closed end of the test stand, thus providing for better accommodation of various service installations.

On the other hand, such an arrangement makes it advantageous to start the test engine from its front end, and, therefore, providing an engine starting installation at such terminal or closed end of the test stand. Such a construction is contrary to general organization of an internal combustion engine. In motor vehicles the engine starting means are located at the rear end of the engine rather than at the front end thereof. In a motor vehicle engine starting means comprise an electric motor including a pinion which engages a large diameter gear, so-called ring gear, heat shrunk on the flywheel of the engine. Because of the large diameter of the ring gear, and the consequent high gear ratio, which may be as high as 15:1 or even more, an electric motor which is a relatively low torque device, is sufficient for starting the engine. On the other hand, the front end of the engine particularly the crankshaft thereof does not permit providing any speed reducing devices; and, therefore, exceedingly high starting torque is necessary to start the engine from its front end. It has been attempted to provide separate high gear ratio devices to compensate for lack of such device within the engine itself at the front end thereof, and to connect such gear device to the front end of the crankshaft. However, such constructions in addition to safety implications gave rise to a number of other serious problems and, therefore, elimination of such constructions has been considered to be one of the critical problems in this particular art.

In addition, since no gear pinion is available in the engine testing installations to form with its screw-type shaft a device known as "Bendix drive," the conventional engine starting devices for engine testing stands are adapted to rotate the test engine for a set period of time such as ten seconds before becoming disconnected. With such constructions, should the test engine be started, say, after three seconds, the driving device and the engine would remain engaged and the engine would drive such driving device for the remaining seven seconds and at a much higher speed, thus endangering the starting device. Also, should the test engine starting device fail to start the test engine within such period, it is automatically disconnected, interrupting the test cycle.

One of the objects of the present invention is to provide an improved starting device for test engines whereby the above difficulties and disadvantages are overcome and largely eliminated, without giving rise to other problems and safe and efficient starting means are provided therefor.

Another object of the present invention is to provide a starting device for test engines or engine testing stands, which device starts the engine from the front end thereof and is located at the terminal or closed end of the stand.

Still another object of the present invention is to provide an improved starting device for engine testing stand, in which device the necessity of providing large gears or speed reducers necessary to produce large gear ratio and therefore high starting torque, is eliminated, and the necessary high starting torque is produced by other improved means.

A further object of the present invention is to provide an improved starting device for engine testing stands, which device becomes connected to the engine automatically and operates to rotate the crankshaft of the engine and thus to start the same, means being provided whereby the engine is automatically disconnected from the driving device as soon as the engine starts, and will not be disconnected after any set period which may prove to be insufficient for starting some of the test engines.

A still further object of the invention is to provide an improved engine starting device which operates automatically and yet is simple in construction, safe and dependable in operation, and is relatively inexpensive to service and to manufacture.

Further objects and advantages of this invention will be apparent from the following description and appended claims, reference being had to the accompanying drawings forming a part of this specification, wherein like reference characters designate corresponding parts in the several views.

FIG. 4 is a view similar in part to FIG. 2, but showing the coupling in the position engaged to the crankshaft of the test engine for starting.

FIG. 5 is a fragmentary view partly in section of the lefthand portion of the connecting device showing positions of the affected parts when, in moving for engagement to the crankshaft, the socket of the starting device fails to make such connection immediately.

It is to be understood that the invention is not limited in its application to the details of construction and arrangement of parts illustrated in the accompanying drawings, since the invention is capable of other embodiments and of being practiced or carried out in various ways within the scope of the claims. Also, it is to be understood that the phraseology and terminology employed herein is for the purpose of description and not of limitation.

Figure 1:
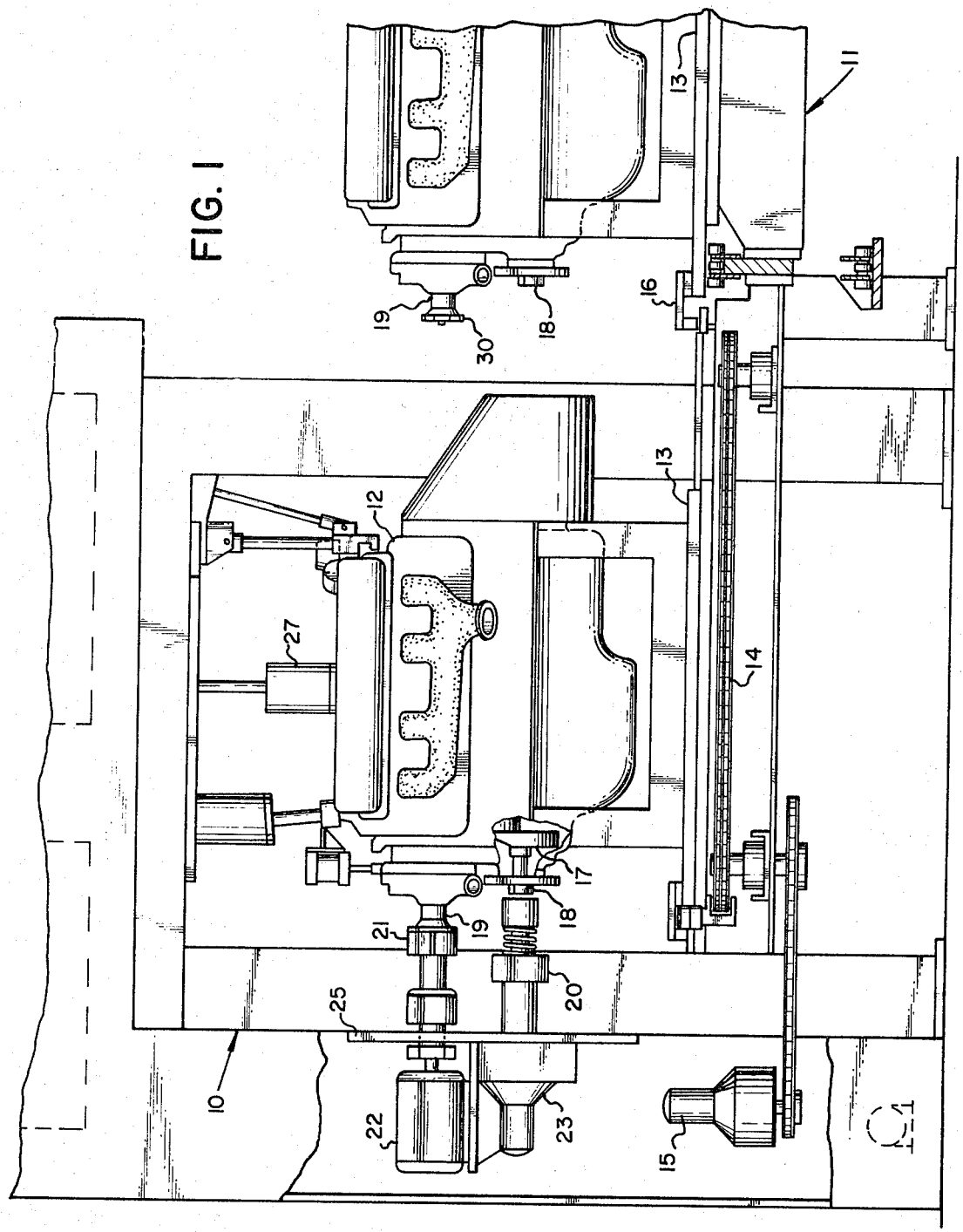
FIG. 1 is a fragmentary elevational view showing a test stand and the adjacent portion of the conveyor, with the test engine having been set in place in the stand and ready for starting.

Referring specifically to the drawings and more particularly to FIG. 1 thereof, the numeral 10 designates generally the test stand operatively arranged adjacent the conveyor 11. The test engine, generally designated by the numeral 12, is shown set in place in the stand 10 after having been moved, together with its adaptor or pallet 13, from the conveyor 11, transversely thereof, into the stand. Moving the test engine from the conveyor into the stand is attained with the aid of chain-and-sprocket means, generally designated by the numeral 14, operated with the aid of a motor 15 to draw test engines into the stand with the aid of a hook means 16 automatically as a part of a test cycle.

The above means and the operative cycle including removal of the test engine from the conveyor and setting it in a test stand, making all required connections, testing the engine by running it under its own power in accordance with the established test procedure, disconnecting service devices and returning the engine to the conveyor, are all described in detail in said co-pending application of Vernon G. Converse III et al. and, therefore, any further detailed description thereof is not believed to be necessary herein.

As indicated in FIG. 1 in the righthand portion thereof wherein a test engine is shown still on the conveyor, for the purposes of the test, the pulley provided on the front end of the crankshaft and the pulley provided on the front end of the water pump shaft together with the fan assembly and the V-belt connecting such pulleys are removed, thus disconnecting drivingly the crankshaft and the water pump shaft of the engine, or are not yet installed. As the engine is moved into the test stand with its front end leading, i.e. moving in first, a hexagon head screw 18, provided on the front end of the crankshaft 17, comes into registry with the connecting device 20 of the engine starting device but not yet into an engagement therewith. The front end 19 of the water pump comes into resulting registry with the coupling 21 connected to an electric motor 22 comprising a water pump driving device. The connecting device 20 of the engine strating device is driven with the aid of an air motor 23. The engine starting device and the water pump driving device are secured to the mounting plate 25 and are supported thereby.

As shown in FIG. 1, when the test engine 12 is located in place in the stand, it is still disengaged from the engine starting device but is engaged to the water pump driving device. In such a position of the test engine various service connections, such as fuel supply means 27, water supply connection, exhaust gases removal connection, and other service connections are made, thus making the test engine 12 ready for starting.

Figure 2:
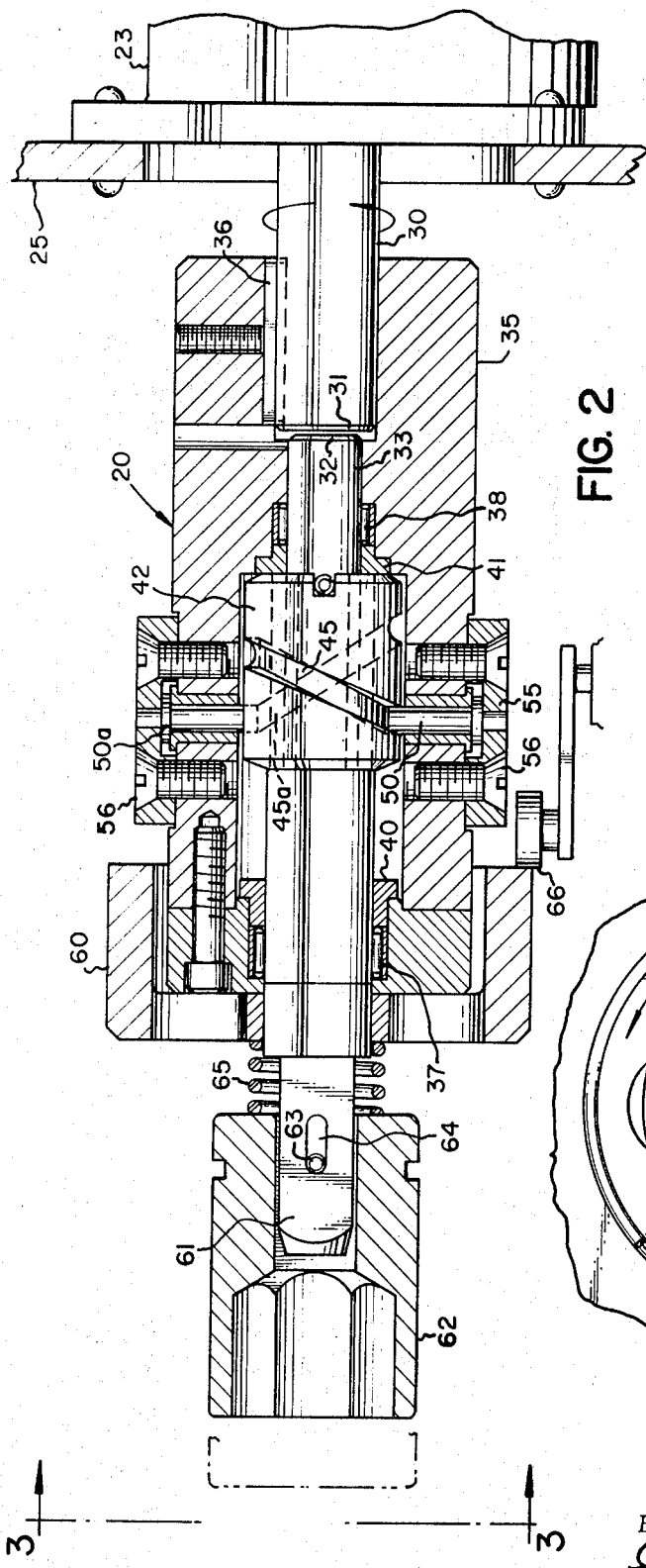
FIG. 2 is a sectional view of the coupling or connecting device provided between the crankshaft of the test engine and the starting motor, which coupling includes means for engaging the crankshaft to the driving motor and thereupon rotating the crankshaft for starting, with the coupling being shown in the position disengaged from the crankshaft.

At the moment the test engine is ready for starting, the connecting device 20 and its operative parts are in their respective positions shown in FIG. 2. As shown in said figure, the drive shaft 30 of the air motor 23 is closely adjacent at its end 31 to the end 32 of the starter shaft 33. Both shafts 30 and 33 are coaxially arranged within the cylindrical body 35 of the connecting device. However, while the shaft 30 is secured to the housing or body 35 axially and is keyed as indicated at 36 for rotation with said body 35 under all conditions, the shaft 33 is mounted in said body 35 in roller bearings 37 and 38 for only limited rotation therein and for longitudinal sliding in the body 35 between the stop bushings 40 and 41. Such operation of the shaft 33 is determined by a cylindrical cam or enlarged portion 42 which may be provided on the shaft 33 integrally therewith or made as a separate piece and secured thereto in any suitable manner. A limited helical slot 45 is provided in said enlargement 42 extending for approximately 180° or half of the circumference of the cam and having two closed ends. The axial extent of said slot 45 determines the distance through which the shaft 33 slides longitudinally or axially.

Figure 3:
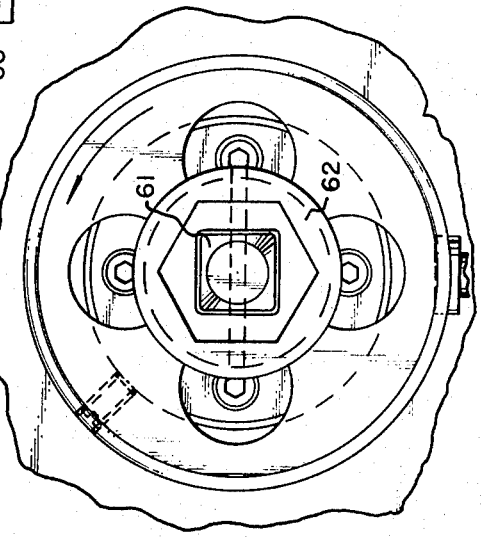
FIG. 3 is an end view of the connecting device, with the observer presumed to look from left to right as indicated with the arrows in FIG. 2.

Within said slot 45 operates a driving pin 50, the upper end of which is carried by the body 35. To retain the operating end of the driving pin 50 in the slot 45, the drive pin 50 is retained in place by a holding plate such as 55, held, in turn, on the body 35 with the aid of screws 56. A flywheel 60 is secured to the shaft 33. The square end 61 of the shaft 33 carries a socket 62 drivingly connected to the shaft by receiving said square end 61 in a hole of a square cross section, see FIG. 3. A pin 63 operating in the slot 64 of the end 61 provides for limited sliding of the socket 62 on the square end 61 of the starter shaft 33. A compression spring 65 keeps the socket 62 in its fully extended position with the pin 63 at the left-hand end of the slot 64.

It will be understood that a second slot, such as 45a and a second driving pin, such as 50a, are provided on the cam 42 at the opposite side thereof at a 180° spacing to produce a balanced construction. Operation of these parts are similar to that described above, and no separate description thereof is believed to be necessary herein.

It will now be seen in view of the foregoing that as soon as the air motor 23 is switched on, which is done automatically when the test engine 12 is ready to be started, rotation of the drive shaft 30 of the motor in the direction indicated in FIG. 2 will cause rotation of the body 35 in the same direction.

It should be noted that the body 35 is secured to the shaft 30 not only for rotation but is also fixed to the shaft 30 axially. In consequence thereof, the driving pin 50 revolves bodily in a plane transverse to the axis of the shaft 33, i.e. without moving in an axial direction with respect to said shaft. As a result of such movement, the end of the pin 50 exerts pressure on the left hand wall of the slot 45 pushing it toward the engine, to the left in FIG. 2 and 4, causing the socket 62 to move toward the crankshaft for the distance equal to the axial lead of the helical slot 45. Said lead is so selected that when the pin 50 reaches the opposite end of the slot 45, the socket 62 is in full engagement with the hexagon head of the screw 18 provided on the end of the crankshaft 17 of the engine. Inertia of the flywheel 60 is sufficient to keep the shaft 33 drivingly secured to the flywheel 60 from rotating with the driving pin until said pin reaches the opposite end of the slot. However, as soon as driving pin 50 reaches said closed end of the slot 45, i.e. its position shown in FIG. 4, it engages the cam 42 for rotation with the body 35, rotating the crankshaft of the engine in the same direction. Such rotation of the starter shaft and of the crankshaft connected thereto continues until the engine starts.

The speed of the air motor 23 is selected to be somewhat slower than the speed of the test engine at start. In the present embodiment of the invention it is preferable to have such speed at approximately 400 r.p.m., with the speed of the test engine at start being approximately 500 r.p.m. Because of such a construction, as soon as the engine starts, its crankshaft begins to rotate in the same direction with the shaft 33 at a higher speed, "overrunning" or driving said shaft. Because of such a condition, the driving pin 50 connected to the housing 35 moves to the opposite end of the slot 45, causing axial movement of the shaft 33 in the return axial direction, i.e. to the right in FIG. 4, moving the socket 62 out of engagement with the hexagon head of the screw 18. In the process of such return movement, the flywheel 60 operates the limit switch 66 switching off and stopping the air motor 23 and thus bringing the parts of the connecting device to their original positions shown in FIG. 2.

It can be easily appreciated that in the process of engagement between the socket 62 having hexagon cavity and the hexagon head of the screw 18, the same are in axial alinement but not in radial alinement. Therefore, a condition such as illustrated in FIG. 5 may result with the left end of the socket coming in contact with the top of the head of the screw 18 but without engaging the flats of the head. Under such a condition the socket 62 is permitted to move to the right by the provision of the slot 64 in the end of the shaft 61, compressing the spring 65. However, further operation of the device quickly causes the hexagon parts to come in radial registry, with the socket 62 fully engaging the hexagon head of the screw 18, i.e. coming into the position shown in FIG. 4.

It should be understood at this point that since rotation of the crankshaft of the test engine does not affect the water pump, said water pump is run independent of the crankshaft by its electric motor 22. Therefore, the electric motor 22 can be started at any desired time, and the water pump is tested in accordance with a separate procedure.

There is thus provided an improved starting device for a test stand whereby the objects of the invention listed above and numerous additional advantages are attained.

I claim:

1. In a test stand for motor vehicle engines having crankshafts, means to receive for running tests said engines ready to be started, an engine starting device comprising a motor having a drive shaft operated by said motor, a starter shaft means operatively connected to said drive shaft and situated between the crankshaft of the test engine and the drive shaft, along the axes of said shafts, said starter shaft means actuated by the drive shaft to move for a predetermined distance from the drive shaft to the chankshaft of the test engine to engage said crankshaft to start the engine and then to return to the original position when the speed of rotation of the engine exceeds the speed of the starter shaft means, said starter shaft means including, a starter shaft and a cylindrical cam provided on said starter shaft coaxially therewith and having a helical slot with an engine side end and a motor side end, the axial extent of said slot being equal to said predetermined distance of starter shaft means movement, a cylindrical body surrounding both of said shafts and fixed to said driving shaft for axial and rotative driving, a driving pin carried by said body and bodily revolving therewith and engaging said cylindrical cam at said helical slot to move, when so revolved, said starter shaft axially for said predetermined distance to engage the crankshaft of the test engine and after said pin reaches the motor side end of said helical slot to rotate said starter shaft and said crankshaft to start the test engine, with said pin returning to the engine side end of the slot and withdrawing the starter shaft from engagement with the crankshaft when the started test engine overruns the motor.

2. The construction defined in claim 1 and including an inertia member mounted on said starter shaft and operative to hold said starter shaft substantially stationary while the driving pin moves through the helical slot at the beginning of the starting operation.

3. The construction defined in claim 1 and including a coupling provided on the engine side end of said starter shaft, and including an internal prismatic member and a complementary external prismatic member, said members being connected to the starter shaft and to the crankshaft, respectively, to connect and to disconnect said shafts in response to axial movements of said starter shaft.

4. The construction defined in claim 3, with the prismatic member secured to the starter shaft having a lost motion mechanism equal substantially to the axial movement of the starter shaft to provide for collapsible movement thereof when engagement of said prismatic members is interfered with, and a yielding spring means providing for completion of the engaging movement of the prismatic member secured to the starter shaft when interference therewith disappears.

5. The construction defined in claim 3 with the prismatic members being in the form of socket-and-nut means.

6. The construction defined in claim 2 and including a switch controlling said motor, with the inertia member moveable axially with the starter shaft and adapted to switch off said motor after the starter shaft returns to its retracted position.

7. The construction defined in claim 1 said motor being an air motor.

References Cited

UNITED STATES PATENTS 3,327,821  6/1967  Digby _____ 192—42

FOREIGN PATENTS 180,387  4/1969  U.S.S.R.

JAMES J. GILL, Primary Examiner
M. SMOLLAR, Assistant Examiner

U.S. Cl. X.R.
123—179 (I) & (F); 192—31, 42, 63